(12) United States Patent
Beck et al.

(10) Patent No.: US 9,285,018 B2
(45) Date of Patent: Mar. 15, 2016

(54) MULTI-SPEED GEARBOX

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/396,088

(22) PCT Filed: Mar. 13, 2013

(86) PCT No.: PCT/EP2013/055059
§ 371 (c)(1),
(2) Date: Oct. 22, 2014

(87) PCT Pub. No.: WO2013/159990
PCT Pub. Date: Oct. 31, 2013

(65) Prior Publication Data
US 2015/0111689 A1    Apr. 23, 2015

(30) Foreign Application Priority Data

Apr. 27, 2012   (DE) .................. 10 2012 207 092

(51) Int. Cl.
*F16H 3/66*   (2006.01)
*F16H 3/44*   (2006.01)

(52) U.S. Cl.
CPC ............ *F16H 3/66* (2013.01); *F16H 2003/445* (2013.01); *F16H 2200/0065* (2013.01);
(Continued)

(58) Field of Classification Search
CPC ............................................... F16H 2200/2097
See application file for complete search history.

(56) References Cited

U.S. PATENT DOCUMENTS 6,960,149 B2   11/2005  Ziemer
7,691,023 B2 *  4/2010  Hart ................. F16H 3/666
                                         475/275
(Continued)

FOREIGN PATENT DOCUMENTS

DE         101 15 995 A1     10/2002
DE    10 2008 031 970 A1      1/2009
(Continued)

OTHER PUBLICATIONS

German Search Report Corresponding to 10 2012 207 031.1 mailed Dec. 19, 2012.
(Continued)

*Primary Examiner* — Sherry Estremsky
(74) *Attorney, Agent, or Firm* — Davis & Bujold, P.L.L.C.; Michael J. Bujold (57) ABSTRACT

A multi-speed transmission in which a sun gear of a fourth planetary gear set is connected with the housing in a non-rotatable manner, a ring gear of a first planetary gear set is permanently connected with a ring gear of the fourth planetary gear set, a sun gear of the first planetary gear set and a sun gear of a second planetary gear set can be coupled with the housing, via a first brake, a carrier of the first planetary gear set can be coupled with the housing, via a second brake, and the output shaft can be coupled with a carrier of the fourth planetary gear set, via a first clutch. Variations of other couplings within the multi-speed transmission forms a set of transmissions having similar properties.

17 Claims, 4 Drawing Sheets

(52) U.S. Cl.
CPC . *F16H2200/0082* (2013.01); *F16H 2200/2012* (2013.01); *F16H 2200/2046* (2013.01); *F16H 2200/2094* (2013.01); *F16H 2200/2097* (2013.01)

(56) References Cited

U.S. PATENT DOCUMENTS

| | | | |
|---|---|---|---|
| 7,695,398 | B2 | 4/2010 | Phillips et al. |
| 7,766,786 | B2 * | 8/2010 | Hukill ................. F16H 3/666 475/275 |
| 8,210,981 | B2 | 7/2012 | Bauknecht et al. |
| 8,398,522 | B2 | 3/2013 | Bauknecht et al. |
| 9,175,751 | B2 * | 11/2015 | Beck ..................... F16H 3/66 |
| 2009/0197734 | A1 | 8/2009 | Phillips et al. |
| 2014/0045640 | A1 * | 2/2014 | Goleski ................. F16H 3/66 475/275 |

FOREIGN PATENT DOCUMENTS

| | | |
|---|---|---|
| DE | 10 2008 038 210 A1 | 3/2009 |
| DE | 10 2008 000 428 A1 | 9/2009 |
| DE | 10 2008 000 429 A1 | 9/2009 |
| DE | 10 2008 041 196 A1 | 2/2010 |
| DE | 10 2008 041 200 A1 | 2/2010 |
| DE | 10 2008 041 209 A1 | 2/2010 |
| DE | 10 2009 020 442 A1 | 11/2010 |
| DE | 10 2009 028 670 A1 | 2/2011 |
| DE | 10 2009 047 279 A1 | 6/2011 |
| JP | 2005-083479 A | 3/2005 |
| JP | 2006-349153 A | 12/2006 |
| WO | WO2014154415 | * 10/2014 |

OTHER PUBLICATIONS

German Search Report Corresponding to 10 2012 207 043.5 mailed Nov. 13, 2012.
German Search Report Corresponding to 10 2012 207 081.8 mailed Dec. 19, 2012.
German Search Report Corresponding to 10 2012 207 085.0 mailed Dec. 19, 2012.
German Search Report Corresponding to 10 2012 207 091.5 mailed Dec. 19, 2012.
German Search Report Corresponding to 10 2012 207 092.3 mailed Dec. 19, 2012.
International Search Report Corresponding to PCT/EP2013/055061 mailed May 21, 2013.
International Search Report Corresponding to PCT/EP2013/055060 mailed May 21, 2013.
International Search Report Corresponding to PCT/EP2013/055058 mailed May 21, 2013.
International Search Report Corresponding to PCT/EP2013/055057 mailed May 21, 2013.
International Search Report Corresponding to PCT/EP2013/055062 mailed May 21, 2013.
International Search Report Corresponding to PCT/EP2013/055059 mailed May 21, 2013.
Written Opinion Corresponding to PCT/EP2013/055059 mailed May 21, 2013.

* cited by examiner

| GEAR | ENGAGED SHIFT ELEMENT | | | | | | GEAR RATIO i | GEAR INTERVAL φ |
|---|---|---|---|---|---|---|---|---|
| | BRAKE | | CLUTCH | | | | | |
| | 51 | 52 | 62 | 63 | 64 | 61 | | |
| 1 |  | × |  | × |  | × | 4.448 | |
| | | | | | | | | 1.698 |
| 2 | × |  |  | × |  | × | 2.619 | |
| | | | | | | | | 1.572 |
| 3 |  |  | × | × |  | × | 1.667 | |
| | | | | | | | | 1.332 |
| 4 |  |  |  | × | × | × | 1.252 | |
| | | | | | | | | 1.252 |
| 5 |  |  | × | × | × |  | 1.000 | |
| | | | | | | | | 1.220 |
| 6 | × |  |  | × | × |  | 0.819 | |
| | | | | | | | | 1.130 |
| 7 |  | × |  | × | × |  | 0.725 | |
| | | | | | | | | 1.165 |
| 8 | × | × |  |  | × |  | 0.623 | |
| | | | | | | | | 1.197 |
| 9 |  | × | × |  | × |  | 0.520 | |
| R |  | × | × |  |  | × | -3.200 | TOTAL 8.548 |
| M |  | × |  |  | × | × | 1.252 | |
| M |  |  | × |  | × | × | 1.252 | |
| M | × |  |  |  | × | × | 1.252 | |

Fig. 9

MULTI-SPEED GEARBOX

This application is a National Stage completion of PCT/EP2013/055059 filed Mar. 13, 2013, which claims priority from German patent application serial no. 10 2012 207 092.3 filed Apr. 27, 2012.

FIELD OF THE INVENTION

The invention relates to a multi-stage transmission in planetary design, in particular for a motor vehicle.

BACKGROUND OF THE INVENTION

Such multi-stage transmissions are mainly used as automatic transmissions of motor vehicles wherein the effective power flow in the respective gear step is defined by a targeted actuation of the shift element within the planetary set. In addition, the planetary sets in an automatic transmission are usually connected with a start-up element subject to a slip effect and alternatively provided with a bypass clutch, as for example a hydrodynamic torque converter or a hydraulic clutch.

A multi-stage transmission in planetary design is known from DE 10 2008 000 428 A1 in which four planetary sets as well as a total of eight rotatable shafts are disposed in a housing, of which one constitutes the input drive shaft and another the output shaft of the multi-stage transmission. Furthermore, at least six shift elements are provided in the area of the shafts, by the targeted actuation of which the power flow within the four planetary sets varies and thus different transmission ratios are definable between the input drive shaft and the output shaft. Hereby it is possible to shift into a total of nine forward gears as well as one reverse gear.

SUMMARY OF THE INVENTION

The object of the invention is to disclose an alternative multi-stage transmission, preferably with an improved degree of efficiency and sufficiently greater and sufficiently evenly distributed transmission ratio range.

The object of the invention is achieved by means of a multi-stage transmission, comprising at least four planetary sets, a housing, an input drive shaft and an output shaft, in which
 a sun gear of the fourth planetary gear set is connected with the housing in a rotatably fixed manner,
 a ring gear of a first planetary gear set is permanently connected with a ring gear of the fourth planetary gear set,
 a sun gear of the first planetary gear set and a sun gear of a second planetary gear set can be coupled with the housing via a first brake,
 a carrier of the first planetary gear set can be coupled with the housing via a second brake,
 the input drive shaft can be coupled with a carrier of the fourth planetary gear set via a first clutch,
 a carrier can be coupled with the sun gear, a ring gear with the sun gear or the ring gear with the carrier, respectively, of the second planetary gear set or the input drive shaft with the sun gear of the second planetary gear set via a second clutch and three of the following five connections are implemented to be permanent and two of the specified connections to be detachable by means of at least one shift element:
  connection of the input drive shaft with the ring gear of the second planetary gear set,
  connection of the input drive shaft with a carrier of a third planetary gear set,
  connection of the drive shaft with a ring gear of the third planetary gear set,
  connection of the ring gear of the first planetary gear set with a sun gear of the third planetary gear set,
  connection of the ring gear of the first planetary gear set with the carrier of the second planetary gear set.

In particular, a gear set is understood to be a planetary gear set; it comprises at least one sun gear, with which one or more planetary gears mesh, a carrier, which determines the axes of the planetary gears, and a ring gear, with which the planetary gears mesh. Preferably, the ring gear has an inner gearing and the sun gear an outer gearing.

One advantage of the invention can be that the shift elements of the multi-stage transmission, that is, the transmission-side brakes and clutches, are easily accessible from the outside. Thus, the actuators, for example electric motors, hydraulic valves, hydraulic pumps and the like, can be disposed in the vicinity of the shift elements, whereby mechanical and/or hydraulic losses can be diminished and less energy can be necessary for the actuation of shift elements. Also, less energy is needed to maintain the shift element in its current operating state, that is, disengaged or engaged, respectively, for example, because the losses in pressure are less as well as a result of short lines. It is also possible to dispose the shift elements on the housing, so they are at least partially rotationally fixed, by means of which, seals that connect a standing line with a rotating line can be completely or partially avoided.

The spatial configuration of easily accessible shift elements simplifies the usual replacement of hydraulically actuated lamellar clutches or brakes by electromechanically or electrohydraulically actuated brakes and clutches, that are comparatively easy to control as needed. Easily accessible shift elements are, on the one hand, brakes that couple a shaft with the housing in a rotatably fixed manner, but, on the other hand, are shift elements on the outer lying shafts of the multi-stage transmission, preferably an input or output shaft to which the hydraulic fluid required for actuation can be supplied comparatively easily.

Besides this property, the multi-stage transmission also has a good degree of gearing efficiency, only little stress on component parts, especially low planetary set and shift element torque, low absolute and relative speeds of rotation and/or low construction costs. The latter makes possible the implementation of the multi-stage transmission with just little weight and low costs. Finally, the multi-stage transmission enables a good transmission ratio range, thus a very serviceable stepping of the gears.

In general, a preferred embodiment of the multi-stage transmission comprises four planetary gear sets, four clutches, two brakes and a fixed coupling of the housing.

Through actuation of two shift elements, respectively (brakes and/or clutches) nine forward gears and one reverse gear can be engaged, wherein three other alternative shift positions are available for the fourth gear.

A hydrodynamic torque converter, a hydrodynamic clutch, and additional start-up clutch, an integrated start-up clutch or brake and/or an additional electric machine can serve as start-up elements.

In principle, an electric machine or other power/energy source can be disposed on each shaft. Furthermore, a freewheel can be disposed on each shaft, basically for the housing or for another shaft.

Preferably the multi-stage transmission is implemented as a standard drive, but a front-traverse design is also conceivable.

All shift elements can act in a friction or form locking manner. Preferably the first clutch and/or the third clutch (in other transmission variants the seventh instead of the third clutch), however, are implemented as form-locking clutches, especially as claw clutches, which leads to a significantly improved efficiency and therefore higher fuel economy.

As a result it is understood that the first and third clutch (or the seventh clutch) need to be actuated only once when shifting from the first through the ninth gear and that therefore these shift elements are especially suited to be implemented as a claw clutch. It is thus also understood that with these shift elements the advantage of the better degree of effectiveness prevails over the disadvantage of the more difficult handling because of their comparatively seldom activation. In particular it is understood that the actuation of both shift elements can take place in comparatively high gears, whereby the difference of rotational speed of the shafts can be small and thus favorable for the one actuation of the claw clutch.

The geometric position (sequence) of the individual gear set and shift elements is freely selectable, as long as it allows the connectivity of elements. The individual elements can thus be shifted in their position arbitrarily.

Further advantageous variants of the multi-stage transmission result from the description in overview with the drawings. Functionally, these have the same properties as the main system, in particular similar degree of effect, similar stepping etc.

BRIEF DESCRIPTION OF THE DRAWINGS

For a better understanding of the invention this will be more precisely explained by means of the following drawings.

They are, in greatly simplified schematic representation.

DETAILED DESCRIPTION OF THE PREFERRED EMBODIMENTS

By way of introduction it should be noted that the same parts are provided with the same reference numbers or same part designations in the differently described embodiments so that the disclosures contained in the whole description can be correspondingly applied to the parts with the same reference numbers or same part designations. The chosen specifications of position, for example such as above, below, on the side etc., also refer to the immediately described as well as represented drawing and with a change of position are to be applied correspondingly to the new position. Furthermore, single features or combinations of features from the different embodiments illustrated and described may also represent, by themselves, independent, inventive or invention-related solutions.

Figure 1:
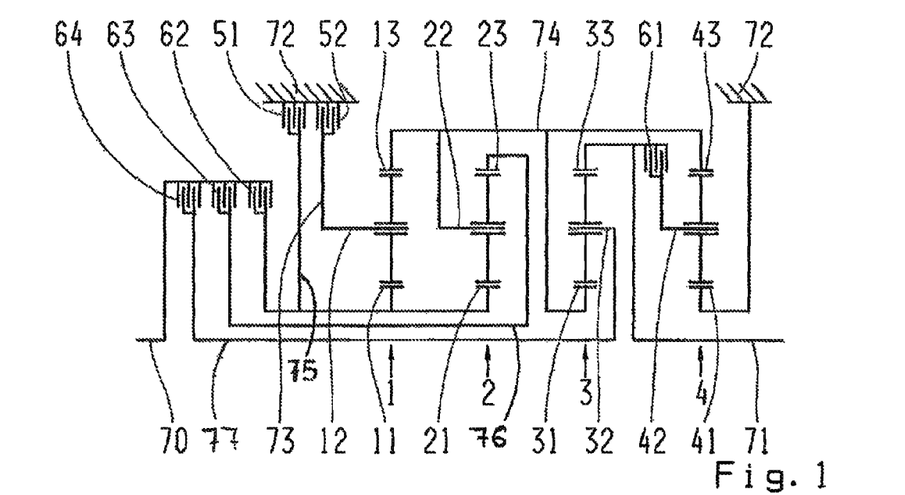
FIG. 1 a first schematically representative model variant of a multi-stage transmission according to the invention.

FIG. 1 shows a multi-stage transmission comprising four planetary gear sets 1, 2, 3, 4, an input drive shaft 70, an output shaft 71, six other rotatable shafts 73, 74, 75, 76, 77, 78, six shift elements 51, 52, 61, 62, 63, 64, of which there are two brakes 51, 52 and four clutches 61, 62, 63, 64. The four planetary gear sets 1, 2, 3, 4 are disposed behind one another in the sequence: first planetary gear set 1, second planetary gear set 2, third planetary gear set 3, fourth planetary gear set 4. The first planetary gear set 1, the second planetary gear set 2, the third planetary gear set 3 and the fourth planetary gear set 4 are constructed as minus planetary gear sets. The planetary gear sets 1, 2, 3, 4 are jointly surrounded by a housing 72. In the variant of the multi-stage transmission of FIG. 1:

a sun gear 41 of the fourth planetary gear set 4 is connected with the housing 72 in a rotatably fixed manner, a ring gear 13 of a first planetary gear set 1 is permanently connected with a ring gear 43 of the fourth planetary gear set 4, a sun gear 11 of the first planetary gear set 1 and a sun gear 21 of a second planetary gear set 2 can be coupled with the housing 72 via a first brake 51, a carrier 12 of the first planetary gear set 1 can be coupled with the housing 72 via a second brake 52, the output shaft 71 can be coupled with a carrier 42 of the fourth planetary gear set 4 via a first clutch 61, the input drive shaft 70 can be coupled with one with the sun gear 21 of the second planetary gear set 2 via a second clutch 62, the input drive shaft 70 can be coupled with the ring gear 23 of the second planetary gear set 2 via a third clutch 63, the input drive shaft 70 can be coupled with the carrier 32 of the third planetary gear set 3 via a fourth clutch 64, the output shaft 71 is permanently connected with the ring gear 33 of the third planetary gear set 3, the ring gear 13 of the first planetary gear set 1 is permanently connected with the sun gear 31 of the third planetary gear set 3 and the ring gear 13 of the first planetary gear set 1 is permanently connected with the carrier 22 of the second planetary gear set 2.

Figure 2:
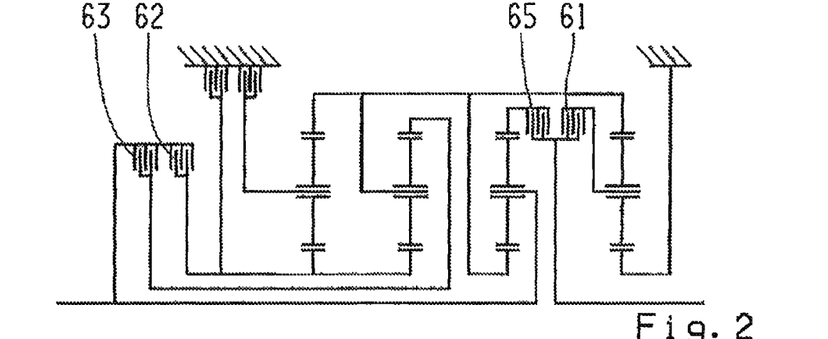
FIG. 2 a second schematically representative model variant of a multi-stage transmission according to the invention.

FIG. 2 shows a multi-stage transmission that is very similar to the multi-stage transmission of FIG. 1 and differs from the embodiment of FIG. 1 in the following points:

the input drive shaft 70 is permanently connected with the carrier 32 of the third planetary gear set 3 and the output shaft 71 can be coupled with the ring gear 33 third planetary gear set 3 via a fifth clutch 65.

Figure 3:
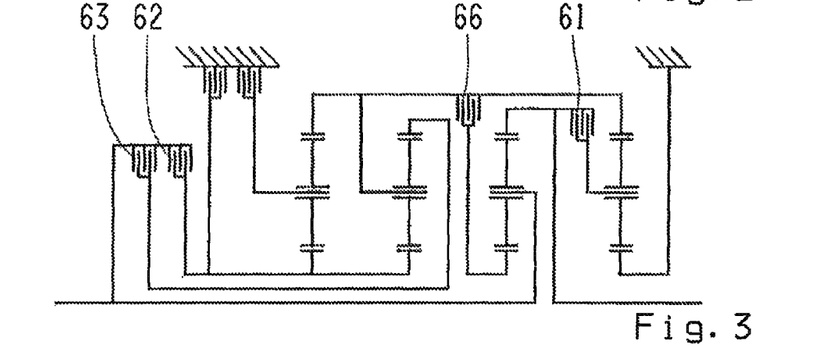
FIG. 3 a third schematically representative model variant of a multi-stage transmission according to the invention.

FIG. 3 shows a multi-stage transmission that is very similar to the multi-stage transmission of FIG. 1 and differs from the embodiment of FIG. 1 in the following points:

the input drive shaft 70 is permanently connected with the carrier 32 of the third planetary gear set 3 and the ring gear 13 of the first planetary gear set 1 can be coupled with the sun gear 31 of the third planetary gear set 3 via a sixth clutch 66.

Figure 4:
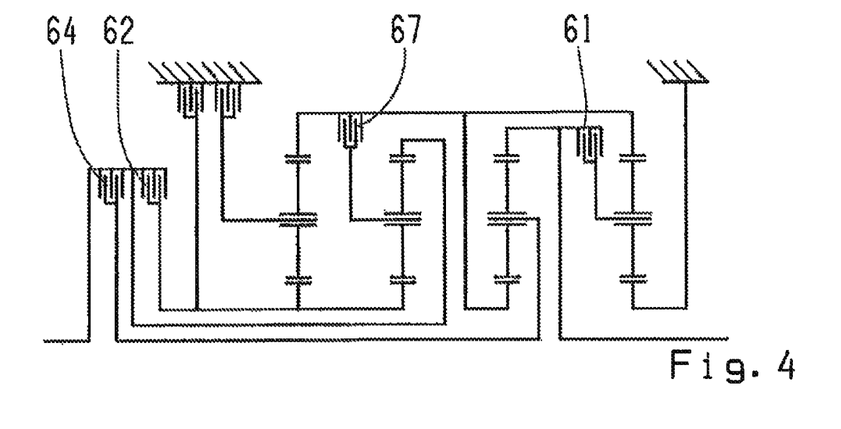
FIG. 4 a fourth schematically representative model variant of a multi-stage transmission according to the invention.

FIG. 4 shows a multi-stage transmission that is very similar to the multi-stage transmission of FIG. 1 and differs from the embodiment of FIG. 1 in the following points:

the input drive shaft 70 is permanently connected with the ring gear 23 of the second planetary gear set 2 and the ring gear 13 of the first planetary gear set 1 can be coupled with the carrier 22 of the second planetary gear set 2 via a seventh clutch 67.

Figure 5:
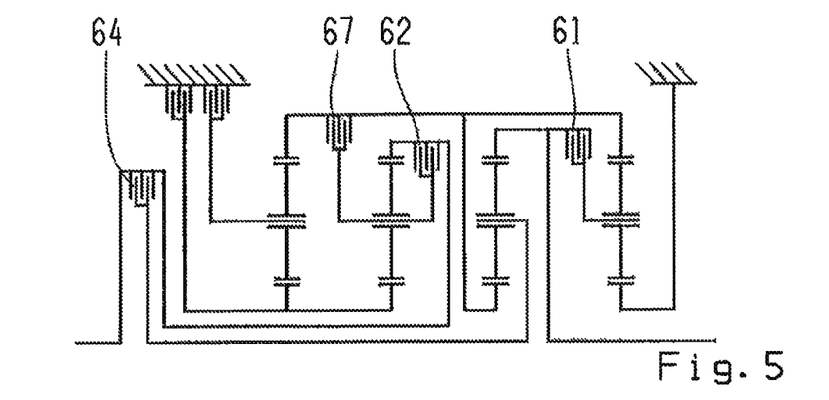
FIG. 5 a fifth schematically representative model variant of a multi-stage transmission according to the invention.

FIG. 5 shows a multi-stage transmission that is very similar to the multi-stage transmission of FIG. 4 and differs from the embodiment of FIG. 4 in the following points:

the ring gear 23 of the second planetary gear set 2 is not to be coupled with the sun gear 21 of the second planetary gear set 2 but with the carrier 22 of the second planetary gear set 2 via a second clutch 62.

Figure 6:
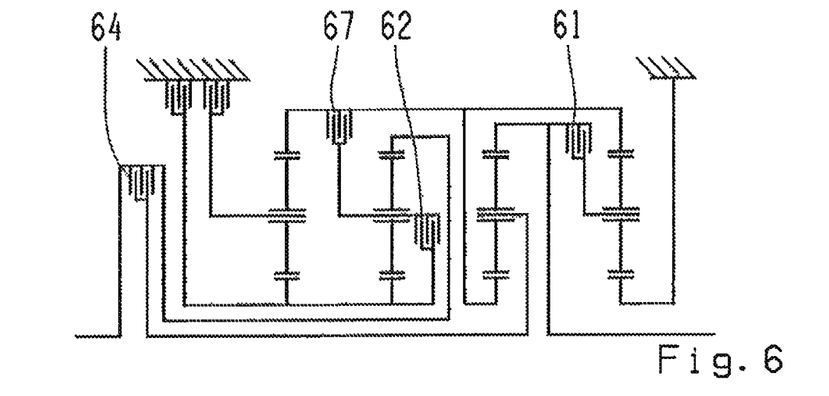
FIG. 6 a sixth schematically representative model variant of a multi-stage transmission according to the invention.

FIG. 6 shows a multi-stage transmission that is very similar to the multi-stage transmission of FIG. 4 and differs from the embodiment of FIG. 4 in the following points:

the sun gear 21 of the second planetary gear set 2 is not to be coupled with the ring gear 23 of the second planetary gear set 2 but with the carrier 22 of the second planetary gear set 2 via a second clutch 62.

At this point it should be noted that the variants illustrated in FIG. 5 and FIG. 6, in regard to the position of the second clutch 62, can also be used in the following variants of the transmission. That is, the second clutch 62 does not have to be disposed between the ring gear 23 and the sun gear 21 also in the following variants of the transmission, but can be disposed between the sun gear 21 and the carrier 22 or between the ring gear 23 and the carrier 21.

Figure 7:
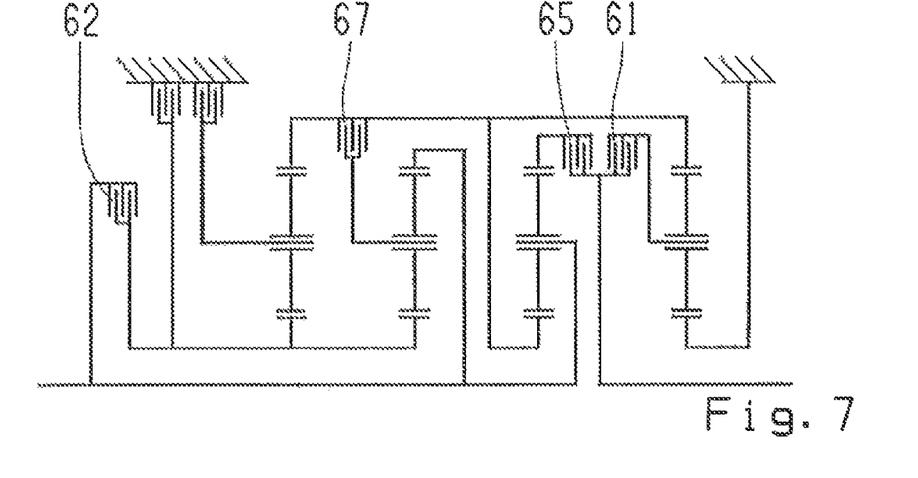
FIG. 7 a seventh schematically representative model variant of a multi-stage transmission according to the invention.

FIG. 7 shows a multi-stage transmission that is very similar to the multi-stage transmission of FIG. 4 and differs from the embodiment of FIG. 4 in the following points:

the input drive shaft 70 is permanently connected with the carrier 32 of the third planetary gear set 3 and the output shaft 71 can be couple with the ring gear 33 of the third planetary gear set 3 via a fifth clutch 65.

Figure 8:
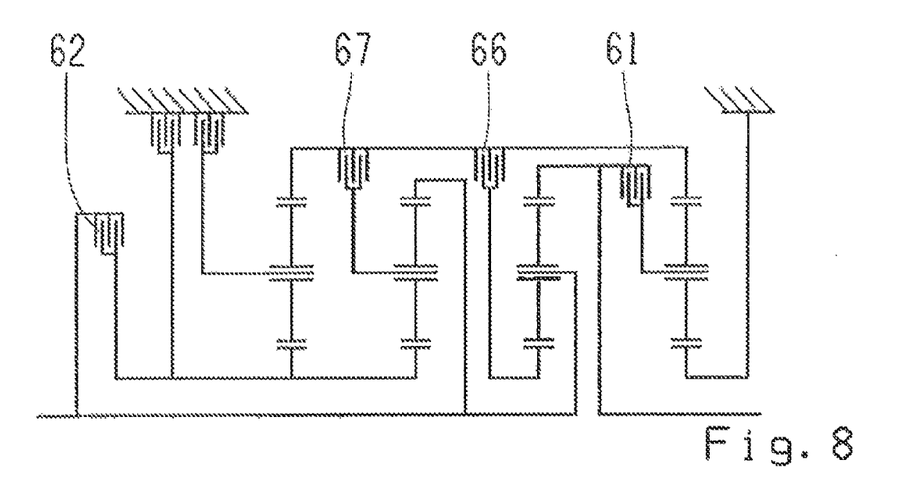
FIG. 8 an eighth schematically representative model variant of a multi-stage transmission according to the invention and FIG. 9 a table that shows the engaged shift elements for the transmission variant illustrated in FIG. 1 in each gear step.

FIG. 8 shows a multi-stage transmission that is very similar to the multi-stage transmission of FIG. 4 and differs from the embodiment of FIG. 4 in the following points:

the input drive shaft 70 is permanently connected with the carrier 32 of the third planetary gear set 3 and the ring gear 13 of the first planetary gear set 1 can be coupled with the sun gear 31 of the third planetary gear set 3 via a sixth clutch 66.

In the multi-stage transmission represented in FIG. 1 the following gears can be engaged:

A first gear can be implemented with the engaged second brake 52, the engaged first clutch 61 and the engaged third clutch 63.

A second gear can be implemented with the engaged first brake 51, the engaged first clutch 61 and the engaged third clutch 63.

A third gear can be implemented with the engaged first clutch 61, the engaged second clutch 62 and the engaged third clutch 63.

A fourth gear is implemented with the engaged first clutch 61, the engaged third clutch 63 and the engaged fourth clutch 64, or with the engaged second brake 52, the engaged first clutch 61 and the engaged fourth clutch 64, or with the engaged first clutch 61, the engaged second clutch 62 and the engaged fourth clutch 64, or with the engaged first brake 51, the engaged first clutch 61 and the engaged fourth clutch 64.

A fifth gear is implemented with the engaged second clutch 62, the engaged third clutch 63 and the engaged fourth clutch 64.

A sixth gear is implemented with the engaged first brake 51, the engaged third clutch 63 and the engaged fourth clutch 64.

A seventh gear is implemented with the engaged second brake 52, the engaged third clutch 63 and the engaged fourth clutch 64.

An eighth gear is implemented with the engaged first brake 51, the engaged second brake 52 and the engaged fourth clutch 64.

A ninth gear is implemented with the engaged second brake 52, the engaged second clutch 62 and the engaged fourth clutch 64.

A reverse gear is implemented with the engaged second brake 52, the engaged first clutch 61 and the engaged second clutch 62.

At the same time, the respective shift elements not mentioned are disengaged.

Figure 9:
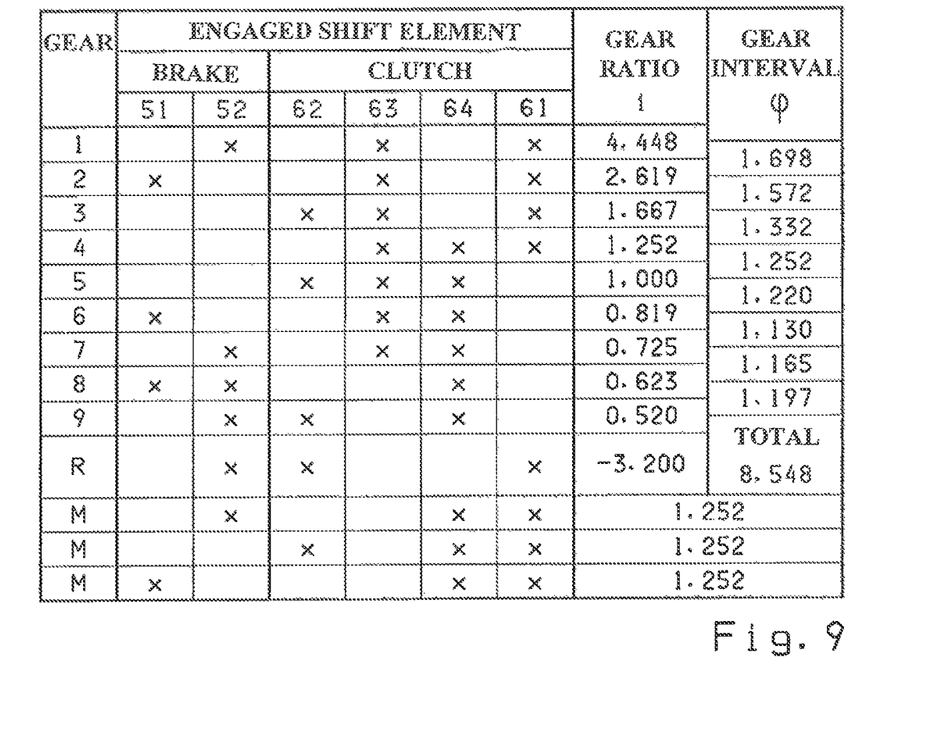

The table in FIG. 9 also shows this as it shows the transmission ratios of the respective gear steps as well.

The shift positions of the multi-stage transmission shown in FIG. 2 are completely similar to those of the multi-stage transmission shown in FIG. 1 but there the fifth clutch 65 takes the place of the fourth clutch 64.

The shift positions of the multi-stage transmission shown in FIG. 3 are completely similar to those of the multi-stage transmission shown in FIG. 1 but there the sixth clutch 66 takes the place of the fourth clutch 64.

The shift positions of the multi-stage transmission shown in FIGS. 4 to 6 are completely similar to those of the multi-stage transmission shown in FIG. 1 but there the seventh clutch 67 takes the place of the third clutch 63.

The shift positions of the multi-stage transmission shown in FIG. 7 are completely similar to those of the multi-stage transmission shown in FIG. 4 but there the fifth clutch 65 takes the place of the fourth clutch 64.

The shift positions of the multi-stage transmission shown in FIG. 8 are completely similar to those of the multi-stage transmission shown in FIG. 4 but there the sixth clutch 66 takes the place of the fourth clutch 64.

Preferably, all the gear sets 1, 2, 3, 4 in the multi-stage transmission are implemented as minus gear sets.

In an advantageous variant the transmission ratios are:
−1.920 between sun gear 11 and ring gear 13 of the first gear set 1, and/or
−1.750 between sun gear 21 and ring gear 23 of the second gear set 2, and/or
−1,650 between sun gear 31 and ring gear 33 of the third gear set 3, and/or
−1.500 between sun gear 41 and ring gear 43 of the fourth gear set 4.

In general, instead of an implementation of a first specified connection/coupling to a carrier 12, 22, 32, 42 of a gear set 1, 2, 3, 4 and a second specified connection/coupling to a ring gear 13, 23, 33, 43 of this gear set 1, 2, 3, 4, the first specified connection/coupling may be implemented to specified ring gear 13, 23, 33, 43 of this gear set 1, 2, 3, 4 and the second specified connection/coupling to specified carrier 12, 22, 32, 42 of this gear set 1, 2, 3, 4, wherein this gear set 1, 2, 3, 4 is implemented as a plus gear set instead of a minus gear set or as a minus gear set instead of a plus gear set, respectively. In other words the connection/coupling to the carrier 12, 22, 32, 42 and to the ring gear 13, 23, 33, 43 of a gear set 1, 2, 3, 4 is exchanged and the direction of rotation between sun gear 11, 21, 31, 41 and ring gear 13, 23, 33, 43 of gear set 1, 2, 3, 4 is reversed. It should also be noted that in the configuration of the multi-stage transmission the value of the stationary transmission ratio is increased by 1 or decreased by 1, if the shiftable transmission ratios between input drive shaft 70 and output shaft 71 should otherwise remain equal. By specified variations of the gear sets 1, 2, 3, 4 the connection/coupling between the individual transmission elements can thus be changed without changing the characteristics of the transmission at the same time. Thereby several structural configurations are available, which can simplify the implementation of the transmission in individual cases. The above-mentioned exchange of the connection/coupling is not limited to one gear set 1, 2, 3, 4, but can be applied to several gear sets 1, 2, 3, 4 at the same time as well.

The embodiments show possible variations in the implementation of a multi-stage transmission of the invention, wherein it should be noted here the invention is not limited to the variations in implementation of it specifically shown, but rather diverse combinations of the individual variations in implementation are possible among themselves and this possibility of variation lies within the ability of the person skilled in the art on the basis of the teaching of technical actions by means of the present invention. In particular, the possibilities that also result from the combinatorics, although not explicitly shown in the drawings, are included in the scope of protection. Moreover, the total conceivable variations in implementation that are possible through combinations of single details of the represented and described embodiment variations are included in the scope of protection.

For the sake of order it is noted that, for better understanding of the design of the multi-stage transmission, this is shown schematically in the drawings and in reality can comprise more parts than shown, less parts than shown or even other parts. In general, the concrete structural configuration lies within the scope of he abilities of a person skilled in the art.

The problem underlying the independent inventive solutions can be inferred from the description.

REFERENCE NUMERALS

1 first transmission gear set
2 second transmission gear set
3 third transmission gear set
4 fourth transmission gear set
11 sun gear of the first transmission gear set
12 carrier of the first transmission gear set
13 ring gear of the first transmission gear set
21 sun gear of the second transmission gear set
22 carrier of the second transmission gear set
23 ring gear of the second transmission gear set
31 sun gear of the third transmission gear set
32 carrier of the third transmission gear set
33 ring gear of the third transmission gear set
41 sun gear of the fourth transmission gear set
42 carrier of the fourth transmission gear set
43 ring gear of the fourth transmission gear set
51 first brake
52 second brake
61 first clutch
62 second clutch
63 third clutch
64 fourth clutch
65 fifth clutch
66 sixth clutch
67 seventh clutch
70 input drive shaft
71 output shaft
72 housing
73, 74, 75, 76, 77, 78 shaft

The invention claimed is:

1. A multi-speed transmission comprising:
an input drive shaft (70),
an output shaft (71);
at least first, second, third and fourth planetary gear sets (1, 2, 3, 4) arranged within a housing (72), and each of the first, the second, the third and the fourth planetary gear sets has gearset elements comprising a sun gear, a ring gear, and a carrier;
the sun gear (41) of the fourth planetary gear set (4) is connected with the housing (72) in a rotationally fixed manner;
the ring gear (13) of the first planetary gear set (1) is permanently connected with the ring gear (43) of the fourth planetary gear set (4);
the sun gear (11) of the first planetary gear set (1) and the sun gear (21) of the second planetary gear set (2) are connectable with the housing (72) via a first brake (51);
the carrier (12) of the first planetary gear set (1) is connectable with the housing (72) via a second brake (52);
the output shaft (71) is connectable with a carrier (42) of the fourth planetary gear set (4) via a first clutch (61);
one of:
the carrier (22) of the second planetary gear set (2) is connectable, via a second clutch (62), with the sun gear (21) of the second planetary gear set (2),
the ring gear (23) of the second planetary gear set (2) is connectable, via the second clutch (62), with the sun gear (21) of the second planetary gear set (2),
the ring gear (23) of the second planetary gear set (2) is connectable, via the second clutch (62), with the carrier (22) of the second planetary gear set (2), and
the input drive shaft (70) is connectable, via the second clutch (62), with the sun gear (21) of the second planetary gear set (2);
three connections of first, second, third, fourth and fifth connections are permanent connections and a remaining two connections of the first, the second, the third, the fourth and the fifth connections are detachable connections which detach by at least one shift element;
the first connection connects the input drive shaft (70) with the ring gear (23) of the second planetary gear set (2);
the second connection connects the input drive shaft (70) with the carrier (32) of the third planetary gear set (3);
the third connection connects the output shaft (71) with a ring gear (33) of the third planetary gear set (3);
the fourth connection connects the ring gear (13) of the first planetary gear set (1) with the sun gear (31) of the third planetary gear set (3); and
the fifth connection connects the ring gear (13) of the first planetary gear set (1) with the carrier (22) of the second planetary gear set (2).

2. The multi-speed transmission according to claim 1, wherein the input drive shaft (70) is connectable with the ring gear (23) of the second planetary gear set (2) via a third clutch (63); and
the ring gear (13) of the first planetary gear set (1) is permanently connected with the carrier (22) of the second planetary gear set (2).

3. The multi-speed transmission according to claim 2, wherein the input drive shaft (70) is connectable with the carrier (32) of the third planetary gear set (3) via a fourth clutch (64);
the output shaft (71) is permanently connected with the ring gear (33) of the third planetary gear set (3); and
the ring gear (13) of the first planetary gear set (1) is permanently connected with the sun gear (31) of the third planetary gear set (3).

4. The multi-speed transmission according to claim 3, wherein a plurality of gears can be implemented by selective engagement of three of the first brake, the second brake, the first clutch, the second clutch, the third clutch and the fourth clutch such that:
  a first gear is implemented by engagement of the second brake (52), the first clutch (61) and the third clutch (63);
  a second gear is implemented by engagement of the first brake (51), the first clutch (61) and the third clutch (63);
  a third gear is implemented by engagement of the first clutch (61), the second clutch (62) and the third clutch (63);
  a fourth gear is implemented by engagement of one of:
    the first clutch (61), the third clutch (63) and the fourth clutch (64, 65, 66),
    the second brake (52), the first clutch (61) and the fourth clutch (64, 65, 66),
    the first clutch (61), the second clutch (62) and the fourth clutch (64, 65, 66), and
    the first brake (51), the first clutch (61) and the fourth clutch (64, 65, 66);
  a fifth gear is implemented by engagement of the second clutch (62), the third clutch (63) and the fourth clutch (64, 65, 66);
  a sixth gear is implemented by engagement of the first brake (51), the third clutch (63) and the fourth clutch (64, 65, 66);
  a seventh gear is implemented by engagement of the second brake (52), the third clutch (63) and the fourth clutch (64, 65, 66);
  an eighth gear is implemented by engagement of the first brake (51), the second brake (52) and the fourth clutch (64, 65, 66);
  a ninth gear is implemented by engagement of the second brake (51), the second clutch (62) and the fourth clutch (64, 65, 66); and
  a reverse gear is implemented by engagement of the second brake (52), first clutch (61) and second clutch (62).

5. The multi-speed transmission according to claim 2, wherein the input drive shaft (70) is permanently connected with the carrier (32) of the third planetary gear set (3);
  the output shaft (71) is connectable with the ring gear (33) of the third planetary gear set (3) via a fourth clutch (65); and
  the ring gear (13) of the first planetary gear set (1) is permanently connected with the sun gear (31) of the third planetary gear set (3).

6. The multi-speed transmission according to claim 2, wherein the input drive shaft (70) is permanently connected with the carrier (32) of the third planetary gear set (3);
  the output shaft (71) is permanently connected with the ring gear (33) of the third planetary gear set (3); and
  the ring gear (13) of the first planetary gear set (1) is connectable with the sun gear (31) of the third planetary gear set (3) via a fourth clutch (66).

7. The multi-speed transmission according to claim 1, wherein the input drive shaft (70) is permanently connected with the ring gear (23) of the second planetary gear set (2); and
  the ring gear (13) of the first planetary gear set (1) is connectable with the carrier (22) of the second planetary gear set (2) via a third clutch (67).

8. The multi-speed transmission according to claim 7, wherein the input drive shaft (70) is connectable with the carrier (32) of the third planetary gear set (3) via a fourth clutch (64);
  the output shaft (71) is permanently connected with the ring gear (33) of the third planetary gear set (3); and
  the ring gear (13) of the first planetary gear set (1) is permanently connected with the sun gear (31) of the third planetary gear set (3).

9. The multi-speed transmission according to claim 8, wherein a plurality of gears can be implemented by selective engagement of three of the first brake, the second brake, the first clutch, the second clutch, the third clutch and the fourth clutch such that:
  a first gear is implemented by engagement of the second brake (52), the first clutch (61) and the third clutch (67);
  a second gear is implemented by engagement of the first brake (51), the ch (61) and the third clutch (67);
  a third gear is implemented by engagement of the first clutch (61), the second clutch (62) and the third clutch (67);
  a fourth gear is implemented by engagement of one of:
    the first clutch (61), the third clutch (67) and the fourth clutch (64, 65, 66),
    the second brake (52), the first clutch (61) and the fourth clutch (64, 65, 66),
    the first clutch (61), the second clutch (62) and the fourth clutch (64, 65, 66), and
    the first brake (51), the first clutch (61) and the fourth clutch (64, 65, 66);
  a fifth gear is implemented by engagement of the second clutch (62), the third clutch (67) and the fourth clutch (64, 65, 66);
  a sixth gear is implemented by engagement of the first brake (51), the third clutch (67) and the fourth clutch (64, 65, 66);
  a seventh gear is implemented by engagement of he second brake (52), the third clutch (67) and the fourth clutch (64, 65, 66);
  an eighth gear is implemented by engagement of the first brake (51), the second brake (52) and the fourth clutch (64, 65, 66);
  a ninth gear is implemented by engagement of the second brake (51), the second clutch (62) and the fourth clutch (64, 65, 66); and
  a reverse gear is implemented by engagement of the second brake (52), the first clutch (61) and the second clutch (62).

10. The multi-speed transmission according to claim 7, wherein the input drive shaft (70) is permanently connected with the carrier (32) of the third planetary gear set (3);
  the output shaft (71) is connectable with the ring gear (33) of the third planetary gear set (3) via a fourth clutch (65); and
  the ring gear (13) of the first planetary gear set (1) is permanently connected with the sun gear (31) of the third planetary gear set (3).

11. The multi-speed transmission according to claim 7, wherein the input drive shaft (70) is permanently connected with the carrier (32) of the third planetary gear set (3);
  the output shaft (71) is permanently connected with the ring gear (33) of the third planetary gear set (3); and
  the ring gear (13) of the first planetary gear set (1) is connectable with the sun gear (31) of the third planetary gear set (3) via a fourth clutch (66).

12. The multi-speed transmission according to claim 1, wherein all the first, the second, the third, and the fourth planetary gear sets (1, 2, 3, 4) are minus gear sets.

13. The multi-speed transmission according to claim 12, wherein at least one of:
  a transmission ratio, between the sun gear (11) of the first planetary gear set (1) and the ring gear (12) of the first planetary gear set (1), is -1.920;

a transmission ratio, between the sun gear (21) of the second gear set (2) and the ring gear (22) of the second gear set (2), is -1.750;

a transmission ratio, between the sun gear (31) of the third gear set (3) and the ring gear (32) of the third gear set (3), is -1.650; and a transmission ratio, between the sun gear (41) of the fourth gear set (4) and the ring gear (42) of the fourth gear set (4), is -1.500.

14. The multi-speed transmission according to claim 1, wherein a connection between a first gearset element to a carrier of a specified one of the first, the second, the third and the fourth planetary gear sets and a connection between a second gearset element to a ring gear of the specified one of the first, the second, the third and the fourth planetary gear sets are interchangeable, and the specified one of the first, the second, the third and the fourth planetary gear sets is implemented either as a plus gear set or a minus gear set.

15. The multi-speed transmission according to claim 1, wherein the multi-speed transmission comprises the first clutch (61) and a third clutch (63, 67).

16. A multi-speed transmission comprising:
an input drive shaft;
an output shaft;
first, second, third and fourth planetary gear sets arranged in a housing, each of the first, the second, the third and the fourth planetary gear sets comprises a sun gear, a ring gear, and a carrier; wherein
the sun gear of the fourth planetary gear set is directly connected to the housing so as to prevent relative rotation therebetween;
the ring gear of the first planetary gear set is directly connected to the ring gear of the fourth planetary gear set so as to prevent relative rotation therebetween;
the sun gear of the first planetary gear set and the sun gear of the second planetary gear set are connectable, via the first brake, to the housing,
the carrier of the first planetary gear set is connectable, via the second brake, to the housing;
the output shaft is connectable, via the first clutch, to the carrier of the fourth planetary gear set;
either the second clutch releasably couples two of the carrier, the sun gear, and the ring gear of the second planetary gear set, or the second clutch releasably couples the input drive shaft and the sun gear of the second planetary gear set;
the input drive shaft connects, via a first connection, to the ring gear of the second planetary gear set,
the input drive shaft connects, via a second connection, to the carrier of the third planetary gear set,
the output shaft connects, via a third connection, to the ring gear of the third planetary gear set,
the ring gear of the first planetary gear set connects, via a fourth connection, to the sun gear of the third planetary gear set,
the ring gear of the first planetary gear set connects, via a fifth connection, to the carrier of the second planetary gear set; and
three of the first, the second, the third, the fourth and the fifth connections are direct connections and a remaining two of the first, the second, the third, the fourth and the fifth connections are releasable connections via third and fourth clutches.

17. The multi-speed transmission according to claim 16, wherein a plurality of gears can be implemented by selective engagement of three of the first brake, the second brake, the first clutch, the second clutch, the third clutch and the fourth clutch such that:

a first gear is implemented by engagement of the second brake, the first clutch and the third clutch;
a second gear is implemented by engagement of the first brake, the first clutch and the third clutch;
a third gear is implemented by engagement of the first clutch, the second clutch and the third clutch;
a fourth gear is implemented by engagement of one of:
the first clutch, the third clutch and the fourth clutch,
the second brake, the first clutch and the fourth clutch,
the first clutch, the second clutch and the fourth clutch, and
the first brake, the first clutch and the fourth clutch;
a fifth gear is implemented by engagement of the second clutch, the third clutch and the fourth clutch;
a sixth gear is implemented by engagement of the first brake, the third clutch and the fourth clutch;
a seventh gear is implemented by engagement he second brake, the third clutch and the fourth clutch;
an eighth gear is implemented by engagement of the first brake, the second brake and the fourth clutch;
a ninth gear is implemented by engagement of the second brake, the second clutch and the fourth clutch; and
a reverse gear is implemented by engagement of the second brake, first clutch and second clutch.

* * * * *